(12) United States Patent
Schaefer (10) Patent No.: US 6,330,622 B1
(45) Date of Patent: Dec. 11, 2001

(54) DIRECT PROCESSOR ACCESS VIA AN EXTERNAL MULTI-PURPOSE INTERFACE

(75) Inventor: Robert A. Schaefer, Santa Cruz, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/178,205

(22) Filed: Oct. 23, 1998

(51) Int. Cl.[7] .............................. G06F 13/10; G06F 13/14
(52) U.S. Cl. .................................................. 710/8; 710/129
(58) Field of Search .............................. 710/128, 8–14, 710/62–64, 102, 129; 364/240, 579; 380/3

(56) References Cited

U.S. PATENT DOCUMENTS

| | | |
|---|---|---|
| 4,484,263 | 11/1984 | Olson et al. . |
| 4,947,477 | 8/1990 | Little . |
| 4,972,470 | 11/1990 | Farago .................................. 380/3 |
| 5,307,346 | 4/1994 | Fieldhouse . |
| 5,371,736 | 12/1994 | Evan . |
| 5,463,740 | 10/1995 | Taniai et al. ........................ 395/299 |
| 5,548,782 | 8/1996 | Michael et al. ..................... 395/835 |
| 5,630,174 * | 5/1997 | Stone, III et al. ..................... 710/63 |
| 5,691,926 | 11/1997 | Cannon et al. ...................... 364/579 |
| 5,832,244 | 11/1998 | Jolley et al. ........................ 395/309 |
| 5,907,686 * | 5/1999 | Zenda .................................. 710/102 |
| 5,909,596 | 6/1999 | Mizuta ................................ 395/883 |
| 5,928,347 * | 7/1999 | Jones .................................... 710/129 |
| 5,930,496 * | 7/1999 | MacLaren et al. .................. 395/500 |
| 5,935,232 | 8/1999 | Lambrecht et al. ................. 710/128 |
| 5,978,861 | 11/1999 | Dearden et al. ........................ 710/8 |
| 6,044,423 * | 3/2000 | Seo et al. ............................ 710/103 |
| 6,164,538 * | 12/2000 | Furuya et al. ...................... 235/449 |

OTHER PUBLICATIONS

Author, Intel Input/Output, Date, pp. 15–1 to 15–9.
IEEE, Supplement to IEEE Std 1149.1b–1990, IEEE Standard Test Access Port and Boundary–Scan Architecture, Mar. 1, 1995, 75 pgs.
IEEE Standard Test Access Port and Boundary–Scan Architecture, IEEE Standard 1149.1a–1993, Oct. 21, 1993, 173 pgs.

* cited by examiner

Primary Examiner—Thomas Lee
Assistant Examiner—Thuan Du
(74) Attorney, Agent, or Firm—Blakely, Sokoloff, Taylor & Zafman LLP (57) ABSTRACT

A method and apparatus for direct access to a processor via an external multi-purpose interface. The present invention provides an interface that detects the presence of a diagnostic device, such as a diagnostic PCMCIA card, or other device, and provides a direct connection to the processor. The direct connection to the processor is not available to non-diagnostic devices.

3 Claims, 8 Drawing Sheets

DIRECT PROCESSOR ACCESS VIA AN EXTERNAL MULTI-PURPOSE INTERFACE

FIELD OF THE INVENTION

The present invention relates to computer systems. More particularly, the present invention relates to access to computer system components via an external multi-purpose interface.

BACKGROUND OF THE INVENTION

In prior art computer systems, the processor typically cannot be accessed directly for diagnostic or other purposes when the computer system case is fully assembled. Because access to the processor is required for basic input/output system (BIOS) development, operating system (O/S) and O/S driver development, application-level source code debugging, code execution time analysis, manufacturing testing and system diagnostics, prior art computer systems require the case to be open during several phases of development, VALIDATION and repair, which may expose computer system components to damage from external conditions such as electrostatic discharge (ESD), physical damage, etc. Opening of the computer system case also makes diagnostics and testing more difficult than performing the same operations without opening the computer system case.

Prior art desktop computer system often include a diagnostic port on the computer system motherboard. The diagnostic port is typically located within a relatively short physical distance of the processor(s) and is used for BIOS development, O/S and O/S driver development, application-level source code debugging, code execution time analysis, manufacturing testing and repair testing. However, because mobile motherboards are more densely packed, the local diagnostic port is typically not provided, and if provided not exposed.

When a diagnostic port is desired an interposer board is placed between the mobile computer system processor and the mobile system motherboard. The interposer board includes the diagnostic port as well as support circuitry. However, use of interposer boards require that the processor be removed from the motherboard and installed on the interposer board. The interposer board is then coupled to the motherboard. This process exposes the processor and other system components to damage. Furthermore, interposer boards are not practical for use by an end consumer of the mobile computer system.

What is needed is a method and apparatus for accessing the processor of a computer system when the case of the computer system is fully assembled.

SUMMARY OF THE INVENTION

A method and apparatus for direct processor access via an external multi-purpose interface is described. The processor is coupled to the external multi-purpose interface by a bus. The external multi-purpose interface has a detection device that detects a diagnostic tool coupled to the interface. The interface is coupled directly to the processor in response to the diagnostic tool being coupled to the interface.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

A method and apparatus for direct processor access via an external multi-purpose interface is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The present invention provides a method and apparatus for direct processor access via an external multi-purpose interface. As used herein "direct processor access" refers to access to the processor without use of intervening functional components, such as bus bridges, memories, etc. Direct processor access does not refer to processor access without use of one or more connectors, buffers, etc. Briefly, the present invention provides an interface that detects the presence of a diagnostic device, such as a diagnostic PCMCIA or CardBus card, or other device, and provides a direct connection to the processor. The direct connection to the processor is not available to non-diagnostic devices.

Figure 1:
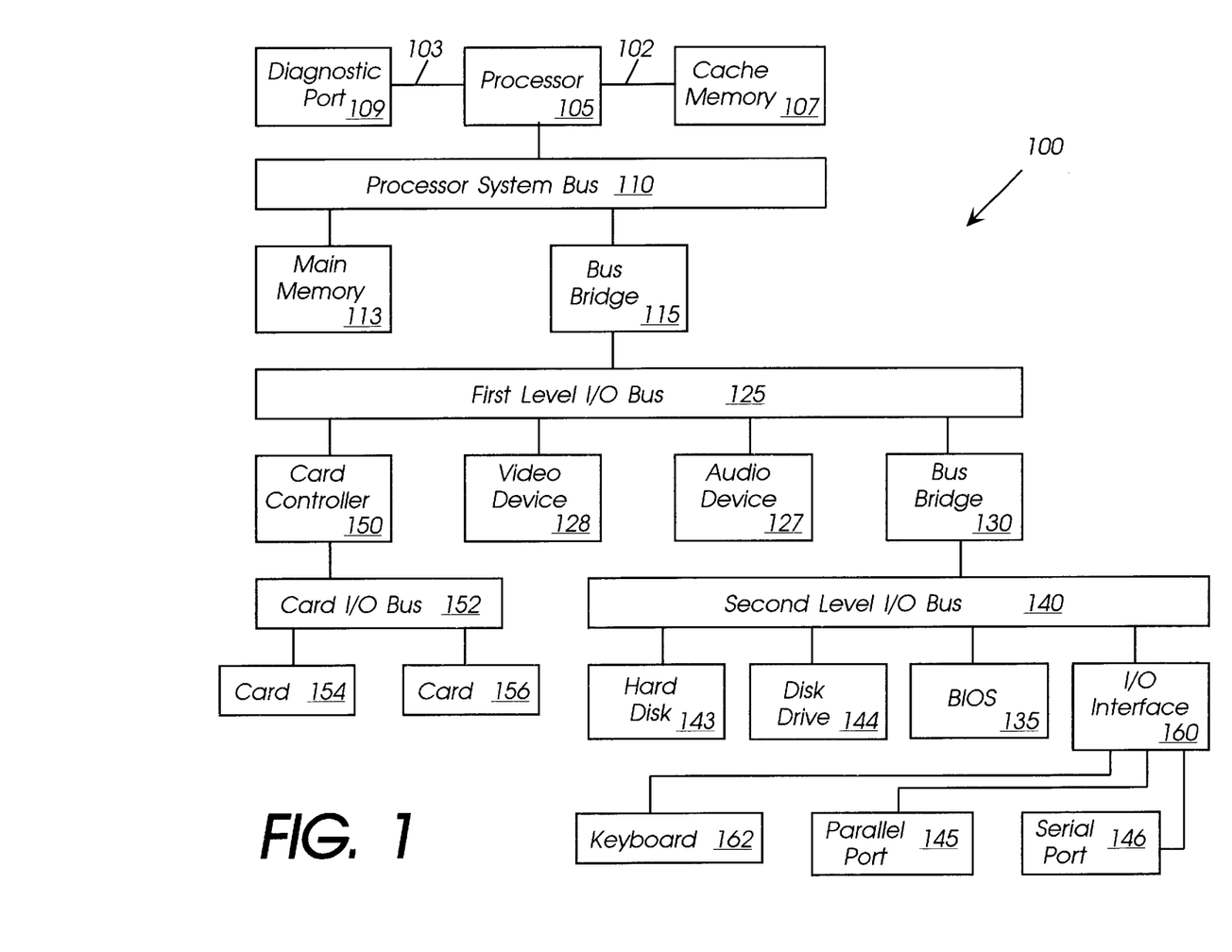
FIG. 1 is one embodiment of a computer system.

FIG. 1 is one embodiment of a computer system. Computer system 100 includes processor 105 coupled to processor system bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used. processor 105 may include a first level (L1) cache memory. In one embodiment, processor 105 is also coupled to cache memory 107, which is a second level (L2) cache memory, via dedicated cache bus 102. The LI and L2 cache memories can also be integrated into a single device. Alternatively, cache memory 107 may be coupled to processor 105 by a shared bus. Cache memory 107 is optional and is not required for computer system 100. Diagnostic port 109 is coupled to processor 105 via dedicated bus 103.

Main memory 113 is also coupled to processor system bus 110. Main memory 113 and cache memory 107 store sequences of instructions that are executed by processor 105. In one embodiment, main memory 113 includes dynamic random access memory (DRAM); however, main memory 113 may have other configurations. The sequences of instructions executed by processor 105 may be retrieved from main memory 113, cache memory 107, or any other storage device. Additional devices may also be coupled to processor system bus 110, such as multiple processors and/or multiple main memory devices. Computer system 100 is described in terms of a single processor; however, multiple processors can be coupled to processor system bus 110.

Processor system bus 110 is coupled to first level I/0 bus 125 by bus bridge 115. In one embodiment, first level input/output I/O bus 125 is a Peripheral Component Interconnect (PCI) standard bus; however, other bus standards may also be used. Multiple devices, such as video device 128 and audio device 127, may be coupled to first level I/O bus 125 to provide I/O functionality.

In one embodiment, card controller 150 is coupled to first level I/O bus 125. Card controller 150 provides and interface between first level I/O bus 125 and card I/O bus 152. Card I/O bus 152 provides connections for one or more cards, such as cards 154 and 156. In one embodiment, card controller 150, card I/O bus 152 and cards 154 and 156 conform to the CardBus standard as defined by Personal Computer Memory Card International Association (PCMCIA) standard 5.0 published March, 1997; however, other card interfaces can also be used.

Bus bridge 130 couples first level I/O bus 125 to second level I/O bus 140. In one embodiment, second level I/O bus 140 is an Industry Standard Architecture (ISA) bus; however, other bus standards may also be used, for example Extended Industry Standard Architecture (EISA). Multiple devices, such as hard disk 143 and disk drive 144 may be coupled to second level I/O bus 140. External interfaces, such as parallel port 145, serial port 146 and keyboard 162 may also be coupled to second level I/O bus 140 through I/O interface 160. Other devices, such as cursor control devices (not shown in FIG. 1), may be coupled to I/O interface 160, or an alternative bus.

In one embodiment, BIOS 135 is coupled to second level I/O bus 140. BIOS 135 provides the lowest level interface between processor 105 and components of computer system 100. BIOS use and development are known in the art and are not described in greater detail.

In computer system 100, diagnostic port 109 is used to directly access processor 105. In one embodiment, diagnostic port 109 is an In-Target Probe (ITP) port according to the ITP protocol available from Intel Corporation of Santa Clara, Calif. In one embodiment, diagnostic port 109 includes a 30-pin high density through hole connector with pins on 0.0050 inch by 0.100 inch centers. Alternatively, diagnostic port 109 includes a 20-pin high density through hole connector with pins on 0.0050 inch by 0.100 inch centers, or any other type of connector configuration.

The present invention is described in terms of access to the processor by an ITP port. It is important to note that an ITP port is not required to access the processor directly. Any port or other device that provides direct processor access can be used with the present invention.

Diagnostic port 109 may be used, for example, to develop a BIOS for processor 105. During BIOS development, a developer develops sequences of instructions to be executed by processor 105 to provide basic input/output functionality for computer system 100. The sequences of instructions may be communicated to processor 105 via diagnostic port 109 and bus 103 for execution and debugging. In one embodiment, the sequences of instructions communicated to processor 105 via diagnostic port 109 have a different format than instructions executed by processor 105 during normal operations.

Diagnostic port 109 may also be used for manufacturing testing, validation and/or repair testing. In one embodiment, diagnostic port provides functionality to provide boundary scans according to IEEE Standard 1149.1-1994, published Mar. 1, 1995. Diagnostic port may also be used in connection with testing for component and system short circuits and open circuits in computer system 100 as well as component functionality and identification testing.

Diagnostic port 109 may be useful, for example, when testing a motherboard during manufacturing to determine whether the motherboard being tested is fully functional. Diagnostic port 109 may also be useful, for example, during repair of a non-functional computer system to determine which components are malfunctioning. Diagnostic port 109 can also be used to download code into an L1 cache memory included in processor 105 or to cache memory 107 through processor 105.

The motherboard of computer system 100 may include multiple direct connection probe locations instead of diagnostic port 109. In one embodiment, the motherboard of computer system 100 includes multiple traces coupled to processor 105 by printed circuit board (PCB) traces.

The traces may be used as probe contact points that are used for diagnostic purposes. In such an embodiment, a single probe interface having multiple contact points in a predetermined configuration to match the traces on the motherboard may be used instead of diagnostic port 109 to provide diagnostic access to processor 105. The probe interface may be used for BIOS development, software development and debug, manufacturing testing and repair testing. By replacing diagnostic port 109 with multiple traces, the amount of space required on the motherboard to provide diagnostic access to processor 105 is reduced.

Figure 2:
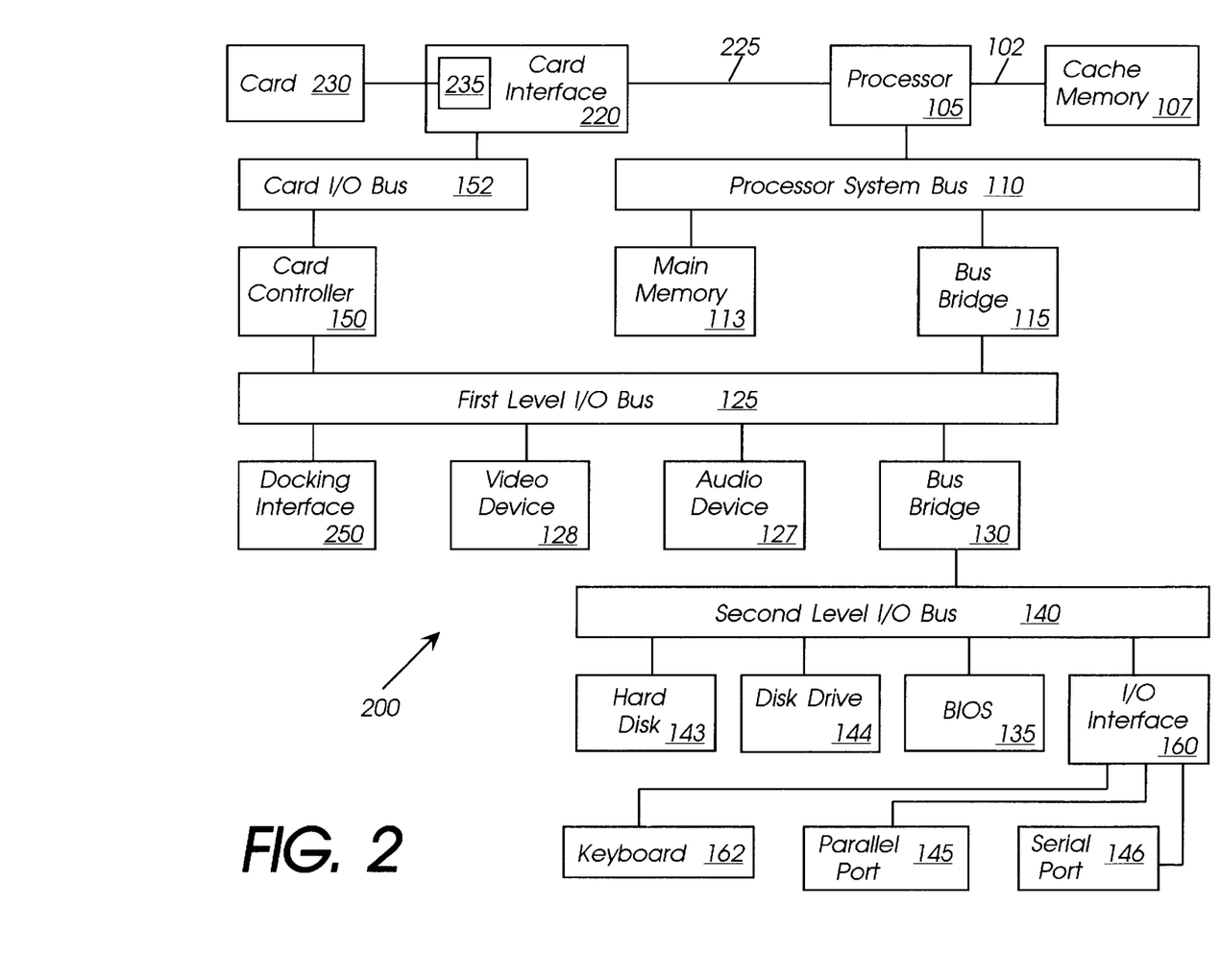
FIG. 2 is an alterative embodiment of a computer system.

FIG. 2 is one embodiment of a computer system. Computer system 200 includes card interface 220 and associated components that are typical of mobile computer systems; however, computer system 200 is not required to be a mobile computer system. The components of computer system 200 described above with respect to computer system 100 of FIG. 1 perform the same functions as the components of computer system 200.

Computer system 200 does not include diagnostic port 109 to provide direct access to processor 105. Direct access to processor 105 is provided by card interface 220 as described in greater detail below. Computer system 200 includes card controller 150 coupled to first level I/O bus 125. Card controller 150 provides an interface between first level I/O bus 125 and card I/O bus 152. In one embodiment card controller 150 and card I/O bus 152 are PCMCIA or CardBus standard devices as defined by PCMCIA 5.0.

Card I/O bus 152 couples card interface 220 to card controller 150. In one embodiment, card interface is a PCMCIA interface that provides slots for two PCMCIA (also called PC) cards. Of course, other configurations that are not PC cards, or are not card devices, may also be used. Card 230 is a PC card that is coupled to card interface 220. Card interface 220 is also directly coupled to processor 105. In one embodiment, card interface 220 is coupled to processor 105 of computer system 200 via diagnostic bus 225 and provides direct access to processor 105 only when a diagnostic PC card 230 is coupled to card interface 220.

Card interface 220 also includes detection circuitry 235 that determines whether card 230 should be coupled to card I/O bus 152 or to processor 105 via diagnostic bus 225. Detection circuitry 235 allows diagnostic PC cards or other diagnostic cards compatible with card interface 220 to access processor 105 directly while allowing non-diagnostic cards to use the same interface to perform their respective functions without direct processor access. Alternatively, detection circuitry 235 may be replaced by a mechanical device for determining whether card 230 is a diagnostic card. In one embodiment card interface 220 is configured to receive multiple cards and use of a diagnostic card does not prevent normal operation of additional cards coupled to card interface 220.

Other interfaces can also be used to provide direct access to processor 105. For example, parallel port 145 and/or serial port 146 may be used. Because standard serial ports and parallel ports do not provide power to connected devices, power is supplied by a connection other than thorough the serial and/or parallel ports. Docking interface 250 may also be used to provide direct access to processor 105. Because docking interfaces are typically proprietary to the manufacturer of a mobile computer system, diagnostic access via the docking interface is not a flexible as diagnostic access through a card interface or serial and/or parallel ports.

Figure 3:
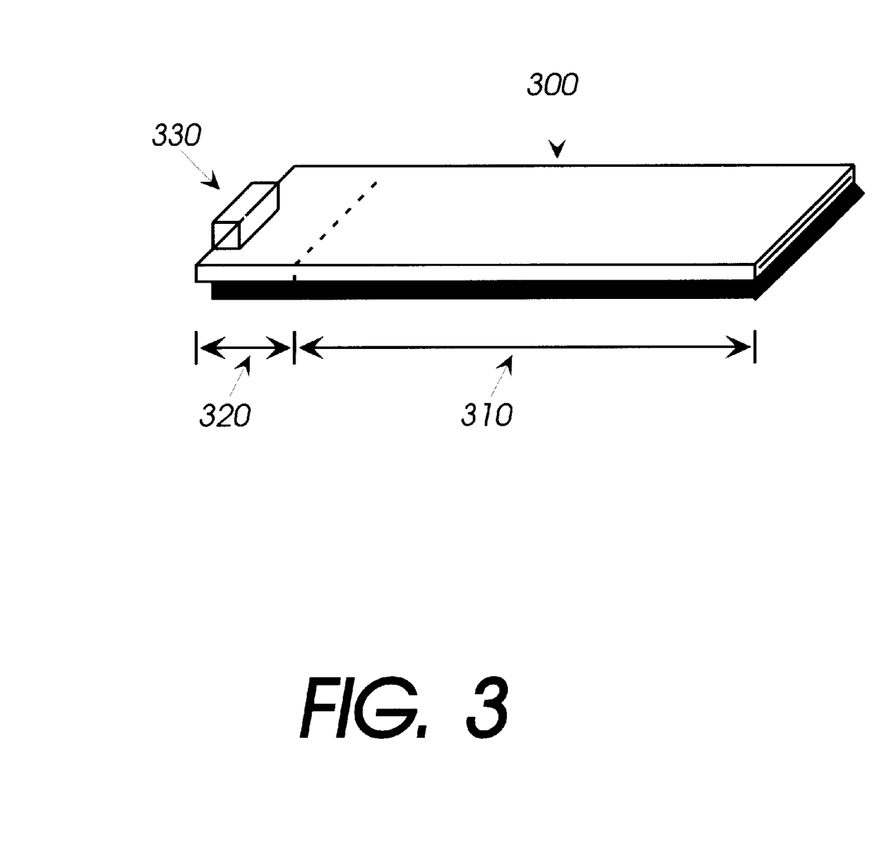
FIG. 3 is a first view of one embodiment of a card for providing diagnostic access via a card interface.

FIG. 3 is a first view of one embodiment of a card for providing diagnostic access via a card interface. The embodiment of FIG. 3 provides diagnostic access via a standard PCMCIA or CardBus card interface. Alternative physical connections may also be provided, for example, a separate set of contacts that are used only for diagnostic purposes, or a switch (or other mechanism) to indicate that the card used is a diagnostic card and that direct access to the processor should be provided.

In one embodiment, card 300 is a PC card that includes a first portion 310 that is received by a PCMCIA socket (not shown in FIG. 3) and a second portion 320 that extends beyond the PCMCIA socket including a diagnostic port 330. Of course, other types of interfaces, whether card sockets or not, may be used instead of PC cards and sockets. It is also important to note that the second portion 320 that extends beyond the socket is not required to practice the invention. For example, the card may include a hard wired cable or other device that provides electrical access to the interface provided by the card and socket.

Alternatively, a serial and/or parallel port may be used to provide access to a processor. In such an embodiment, a card is not required and a different device, such as a cable with serial and/or parallel port interface(s) would be used. A docking station interface could also be used to provide access to a processor. In such an embodiment, a cable or other device with an interface designed to work with the docking interface would be used.

In one embodiment, diagnostic port 330 is an ITP port; however, other types of ports may also be used, for example, TAP. Diagnostic port 330 is not required to practice the present invention. For example, diagnostic port 330 may be replaced by a cable hard wired to card 300. Of course, other ports or connections may also be used.

Figure 4:
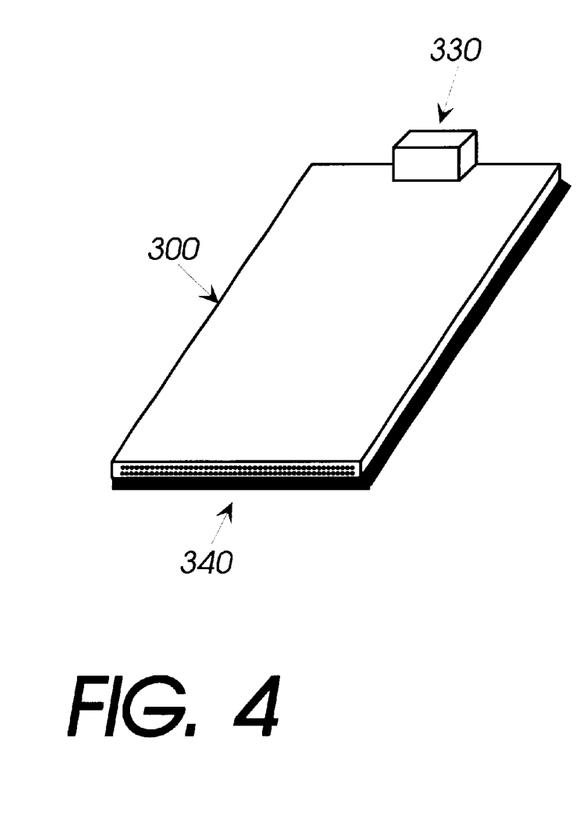
FIG. 4 is a second view of one embodiment of a card for providing diagnostic access via a card interface.

FIG. 4 is a second view of one embodiment of a card for providing diagnostic access via a card interface. Card 300 includes pin receptacles 340. In one embodiment, card 300 is a PCMCIA Type I card having 68 pin receptacles disposed in two rows. Alternatively, card 300 may be a different type of PC card, for example, Type II, Type III or Type IV, or card 300 may be a different type of card with a different pin configuration.

Figure 5:
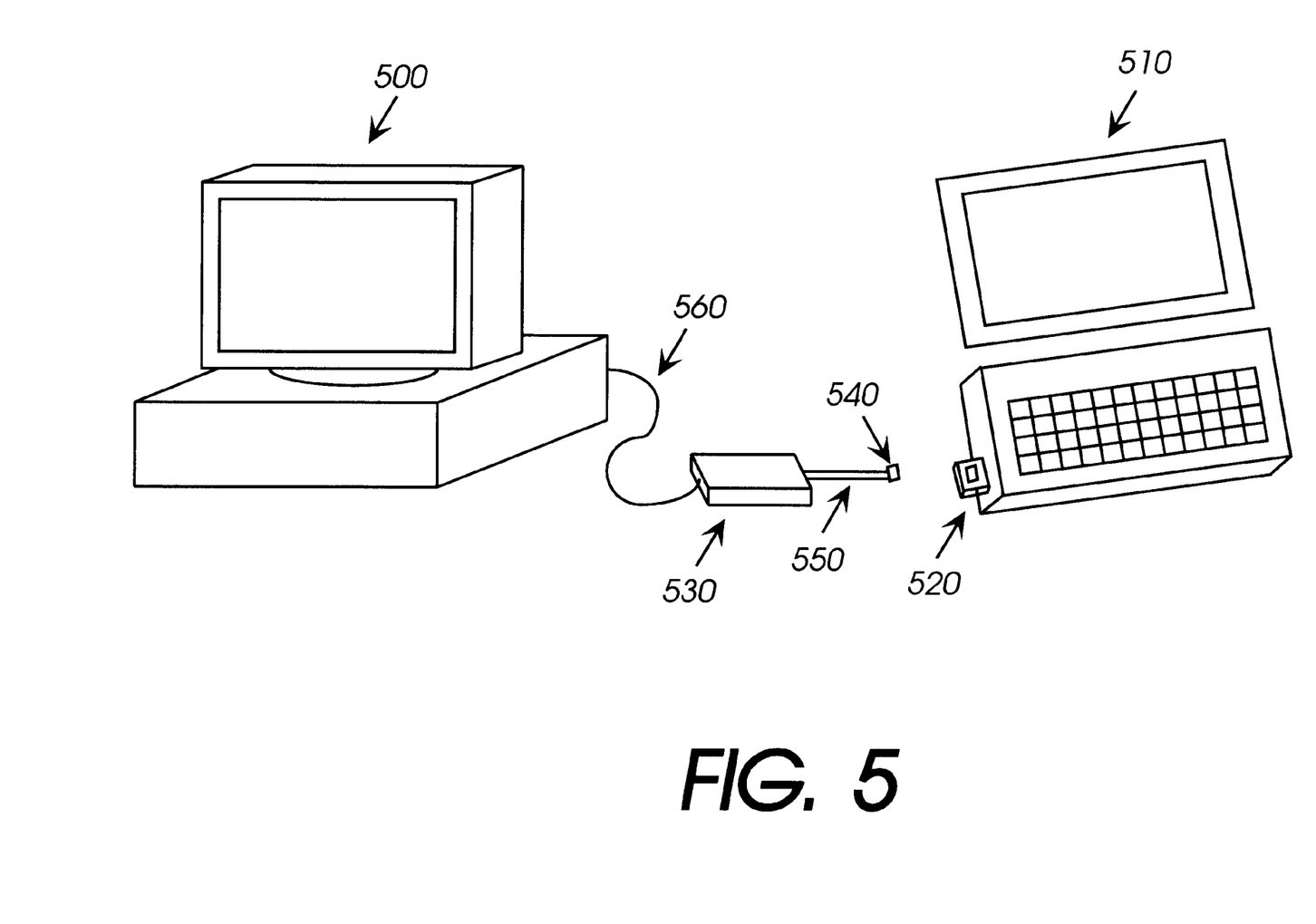
FIG. 5 is one embodiment of an arrangement for diagnosis and testing of a target computer system.

FIG. 5 is one embodiment of an arrangement for diagnosis, software development and debug, and testing of a target computer system. The arrangement of FIG. 5 allows a user of host system 500 to access a processor of target system 510 for diagnostic purposes. The user may also run diagnostic tests on the components of target system 510. While FIG. 5 depicts host system 500 as a desktop computer system and target system 510 as a mobile computer system, the present invention is not limited to such configurations. Host system 500 may be a desktop computer system, a mobile computer system or any other diagnostic tool. Target system 510 may be a mobile computer system, a non-computing device, such as a personal digital assistant (PDA), cellular telephone, or other device, or a desktop computer system.

Host system 500 allows a user to run diagnostic software to access the processor of target system 510. For example, host system 500 may allow the user to issue commands to the processor or target system 510 via a keyboard (not shown in FIG. 5) coupled to host system 500. Host system 500 may also run a diagnostic suite that automatically and sequentially checks the components of target system 510.

In one embodiment, sequences of instructions stored in host system 500 and issued by the processor of host system 500 are communicated to Buffer 530 via cable 560. Buffer 530 issues commands to the processor of target system 510 in response to commands from host system 500 communicated via cable 560. The commands are communicated via cable 550 to interface 540 which is received by a socket on card 520. The interface couples to card 520 (not shown in FIG. 5) provides direct access to the processor of target system 510 because card 520 is a diagnostic card. In one embodiment, the components of the arrangement of FIG. 5 conform to the ITP protocol; however, other protocols and interfaces may be used.

In another embodiment, the components of Buffer 530 are included in a card that is included in host system 500. In such an embodiment, a single cable runs from the card in host system 500 to the PC card in target system 510. In another embodiment, both host system 500 and target system 510 have PC cards to provide direct access to the processor of target system 510 by host system 500. Of course, other configurations may also be used.

Figure 6:
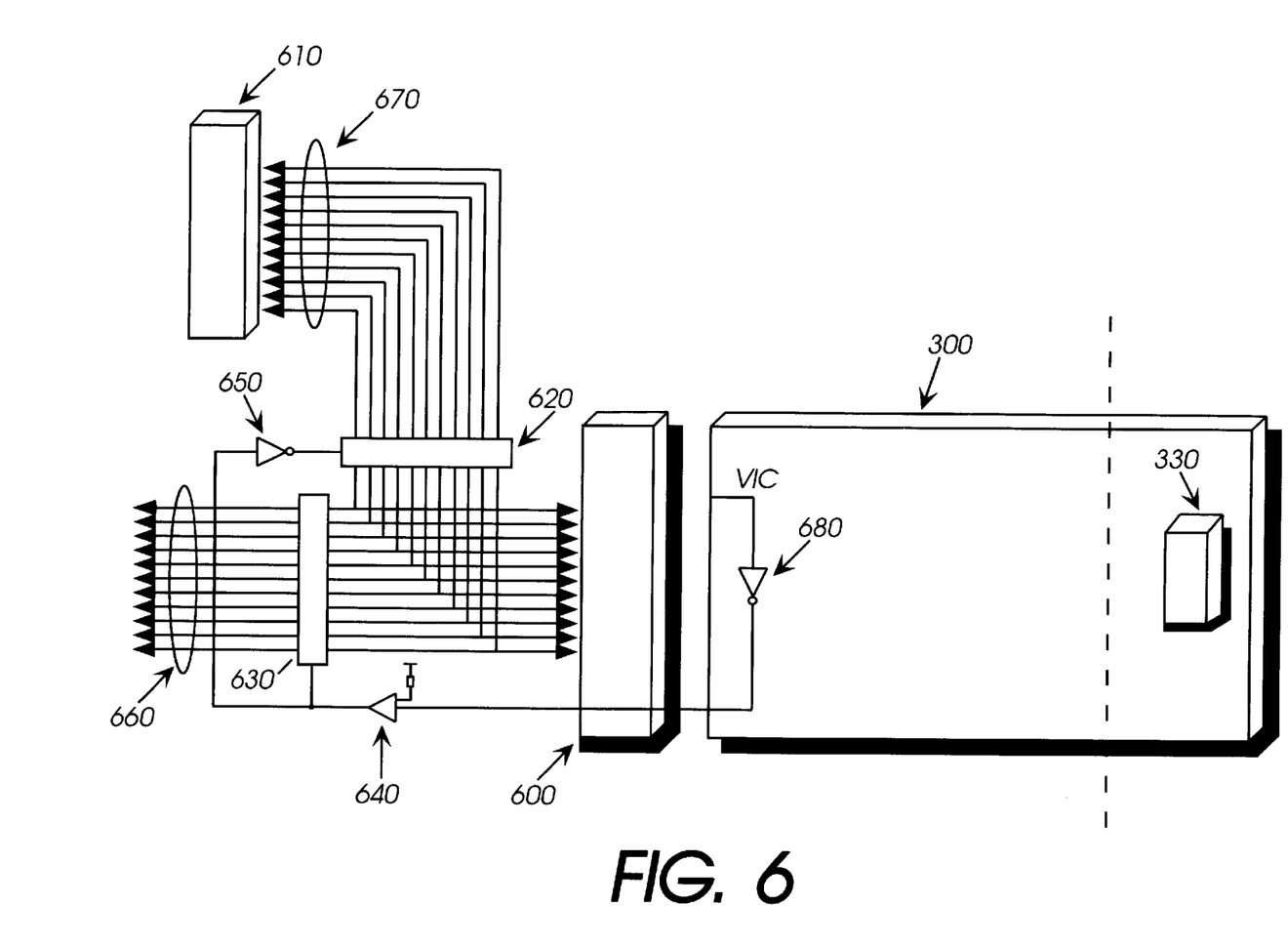
FIG. 6 is one embodiment of a card and interface for providing direct access to a processor from a card.

FIG. 6 is one embodiment of a card and interface for providing direct access to a processor from a card. The card interface of FIG. 6 can be part of a shared card interface that provides simultaneous access for multiple cards. The embodiment of FIG. 6 is described in terms of electrical circuitry that detects the presence of a diagnostic card in a PC card slot. It is important to note that other alternatives can also be used with the present invention. For example, a mechanical device may be used to provide an interface between a card and the system processor.

Alternatively, electrical and/or mechanical detection may used to provide direct diagnostic interface coupled to a serial port, a parallel port or a docking port. A special-purpose card that couples to an interface that provides access to the processor without providing PC card or other device functionality can also be used to access the processor without removing the computer system case.

In one embodiment, pins of socket 600 are received by receptacles on diagnostic card 300 (not shown in FIG. 6). In an embodiment where socket 600 and diagnostic card 300 are PCMCIA or CardBus devices, socket 600 includes pins of three sizes. Power signals (Vpp and Vcc) are connected first through the longest pins. Data, address and control signals are connected second through medium length pins. A card detect pin is connected third through a short pin.

In one embodiment, diagnostic card 300 one or more Vcc pins is/are coupled to an inverter, such as inverter 680. The output of inverter 680 is coupled to a predetermined pin, such as a ground (GND) or Vpp pin; however, other pins may also be used. The pin receiving the output of inverter 680 is coupled to provide an input to comparator 640. The second input of comparator 640 is a predetermined voltage level. In one embodiment, when diagnostic card 300 is coupled to socket 600, the input to comparator 640 is a low or negative voltage. When a non-diagnostic card is coupled to socket 600 (not shown in FIG. 6), a low or negative voltage is not applied to comparator 640, which indicates normal operation.

Under normal operation, comparator 640 enables buffer 630, which couples bus 660 to socket 600. In one embodiment, bus 660 is compatible with the CardBus standard however, other types of busses may also be used. The CardBus standard is defined by the PCMCIA 5.0 standard and provides 32-bit functionality.

When a diagnostic card is coupled to socket 600 and comparator 640 receives a low or negative voltage, buffer 630 is disabled and buffer 620 is enabled via inverter 650. When buffer 620 is enabled processor 610 is directly coupled to socket 600 via bus 670. In one embodiment, diagnostic card 300, diagnostic port 330, socket 600, buffer 620 and bus 670 allow access to processor 610 according to the ITP protocol; however, other protocols may also be used.

Thus, the present invention provides direct processor access via an external multi-purpose interface with a diagnostic card. The multi-purpose interface provides non-diagnostic functionality when a non-diagnostic card is used by providing standard (not direct) processor access. The present invention thereby provides diagnostic functionality without requiring dedicated hardware for diagnostic purposes.

Figure 7:
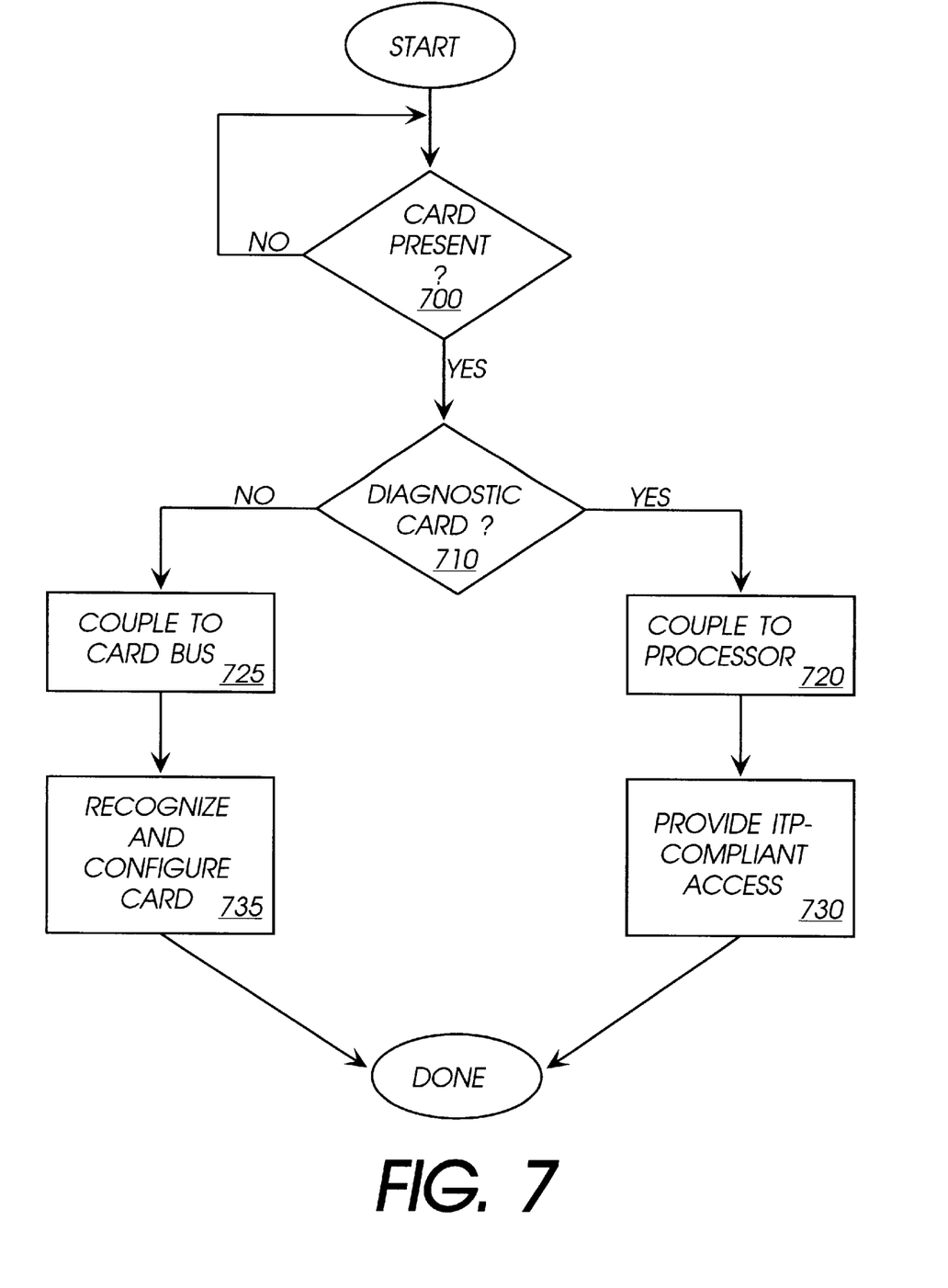
FIG. 7 is one embodiment of a flow diagram for electrically detecting a diagnostic card in a PCMCIA or CardBus slot.

FIG. 7 is one embodiment of a flow diagram for electrically detecting a diagnostic card in a PCMCIA or CardBus slot. It is important to note that FIG. 7 is described in terms of PCMCIA interfaces and electrical detection of presence a diagnostic card; however, a described above, the present invention is not limited to PCMCIA-compatible devices or electrical detection. Detection may be accomplished by mechanical devices, such as additional contacts and/or a specific shape for the diagnostic card.

In step 700, the system waits for a card to be inserted. When a card is inserted, the system determines whether the card is a diagnostic card in step 710. This may be accomplished, for example, by receiving a predetermined voltage on a predetermined pin. Alternatively,a mechanical switching device may be used to determine the presence of a diagnostic card.

In one embodiment, if the card is not a diagnostic card, the card is coupled to the CardBus in step 725. Alternatively, a different bus protocol may be used. The card is recognized and configured in step 735 according to the PCMCIA protocol. Steps 725 and 735 provide PCMCIA functionality, not diagnostic functionality, and therefore are not required to practice the present invention. If the card is a diagnostic card it is coupled to the processor in step 720. Once coupled to the processor, the system provides ITP-compliant or other diagnostic access to the processor in step 730.

Figure 8:
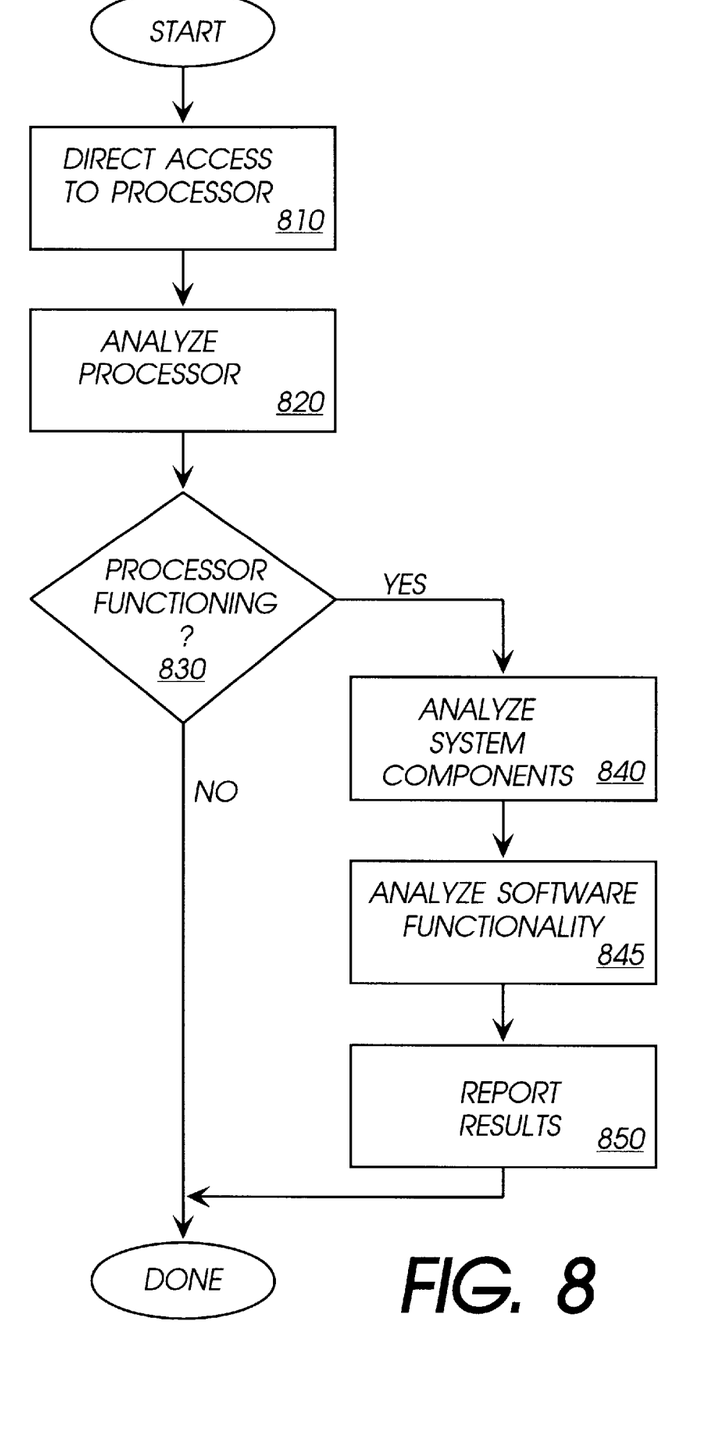
FIG. 8 is one embodiment of a flow diagram for performing diagnostics on a target system.

FIG. 8 is one embodiment of a flow diagram for performing diagnostics on a target system. The flow diagram of FIG. 8 includes optional processing not required to practice the present invention. The flow of FIG. 8 can also be used for BIOS development and software code development.

At 810, direct access to the processor is provided. Direct access may be provided in any manner described above, for example, via a diagnostic PCMCIA card interface, a docking interface, or a serial and/or parallel port interface.

The processor is analyzed at 820. In one embodiment, the processor is analyzed according to a boundary scan as described in IEEE Standard 1149.1. Alternatively, other processor analysis procedures may be used. In one embodiment, the processor and processor interface connections are checked for open circuits and short circuits; however, such checking is not necessary.

If the processor is not functioning at 830, the process is complete. The results of the diagnosis is that the processor must be replaced or the processor power plane is damaged. If the processor is functioning, other components coupled to the processor may be analyzed. System analysis steps are optional, but are useful to provide diagnostic access to the components of a computer system without the need of removing the cover of the computer system.

At 840, the components of the computer system are analyzed in a serial boundary scan through the processor. In one embodiment, the boundary scan is performed according to IEEE Standard 1149.1; however, other boundary scan procedures or other diagnostic procedures may also be performed. The system may also check for short circuit and/or open circuits. The system diagnostic process may be used, for example, to determine whether a memory subsystem or I/O component(s) are properly functioning.

At 845, software functionality is analyzed. At 850, the results of the diagnostic procedure are reported. The reporting of results may be accomplished in any manner known in the art and are not central to the present invention. After reporting the results, the process is complete.

Figure 9:
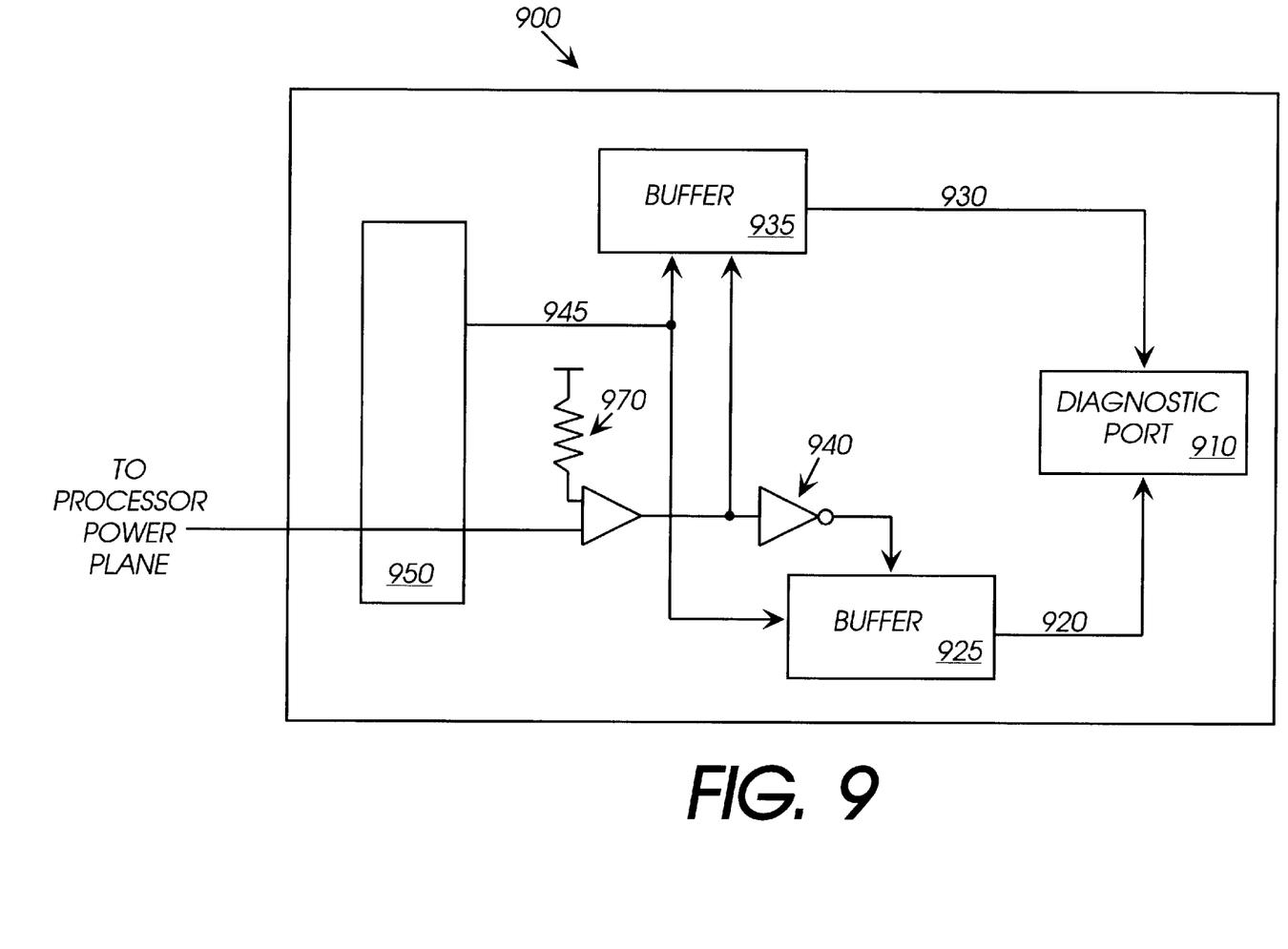
FIG. 9 is one embodiment of a diagnostic card that detects the type of processor and provides the appropriate signal interface.

FIG. 9 is one embodiment of a diagnostic card that detects the type of processor and provides the appropriate signal interface. The embodiment of FIG. 9 is described in terms of two possible processors operating at different voltage levels; however, any number of processors and voltage levels may be supported. The diagnostic card of FIG. 9 determines the operating voltage of the processor and couples the card diagnostic port directly to the processor via an interface having the appropriate voltage levels.

Diagnostic card 900 includes interface 950 to provide access to a multi-purpose port of a computer system. In one embodiment, interface 950 is a PCMCIA or CardBus interface; however interface 950 may be a non-PCMCIA interface on a PC card or other device.

Interface bus 945 is coupled between interface 950 and buffers 925 and 935. A buffer is provided for each voltage level at which a possible processor operates. In one embodiment, buffer 925 is used when the processor operates at 2.5 Volts and buffer 935 is used when the processor operates at 1.6 Volts. Of course, different voltage levels as well at more than two voltage levels may be supported.

In one embodiment, pull-up resistor 960 is coupled to a Vcc pin of interface 950 to provide a high voltage to control buffers 925 and 935. Inverter 940 inverts the voltage level provided by resistor 960 to keep buffer 925 at a state opposite of buffer 935. Comparator 965 has an output coupled to buffer 935 and to inverter 940 to control the operation of buffers 935 and 925. Resistor 970 provides a voltage "set point" with which to compare processor voltages.

Comparator 965 also receives a voltage from interface 950 corresponding to the voltage level of the processor power plane. The voltage of the processor is input from interface 950 and compared to the voltage set point supplied by resistor 970. The output of comparator 970 enables either buffer 925 or buffer 935. The enabled buffer couples diagnostic port 910 to interface 950.

Buffer 925 is coupled to diagnostic port 910 via intermediate bus 920. Similarly, buffer 935 is coupled to diagnostic port 910 via intermediate bus 930. Busses 920 and 930 couple interface bus 945 to diagnostic port 910 using the appropriate voltage levels for the processor to which diagnostic card 900 is coupled.

In the foregoing specification, the present invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A device comprising:

a device interface compatible with an external multi-purpose interface of an electronic system, wherein the multi-purpose interface receives devices of a first type and of a second type;

detection circuitry coupled to the device interface to detect an operating voltage of a processor in the electronic device; and selection circuitry coupled to the detection circuitry to select a diagnostic interface to be coupled to the device interface based on the operating voltage.

2. The device of claim 1 wherein the device interface is a PCMCIA Type I card interface.

3. The device of claim 1 wherein the device interface is a CardBus interface.

* * * * *